(No Model.)

C. SMITH.
AXLE LUBRICATOR AND WRENCH.

No. 441,074. Patented Nov. 18, 1890.

Witnesses
C. C. Burdine
H. E. Peck

Inventor
Chas. Smith.
per O. C. Duff
Atty.

THE NORRIS PETERS CO., PHOTO-LITHO., WASHINGTON, D. C.

UNITED STATES PATENT OFFICE.

CHARLES SMITH, OF JACKSON, OHIO.

AXLE-LUBRICATOR AND WRENCH.

SPECIFICATION forming part of Letters Patent No. 441,074, dated November 18, 1890.

Application filed January 28, 1890. Serial No. 338,383. (No model.)

*To all whom it may concern:*

Be it known that I, CHARLES SMITH, of Jackson, in the county of Jackson and State of Ohio, have invented certain new and useful Improvements in Axle-Lubricators; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in axle-lubricators; and the invention consists in certain novel features of construction and in combination of parts more fully described hereinafter, and particularly pointed out in the claims.

Figure 1:
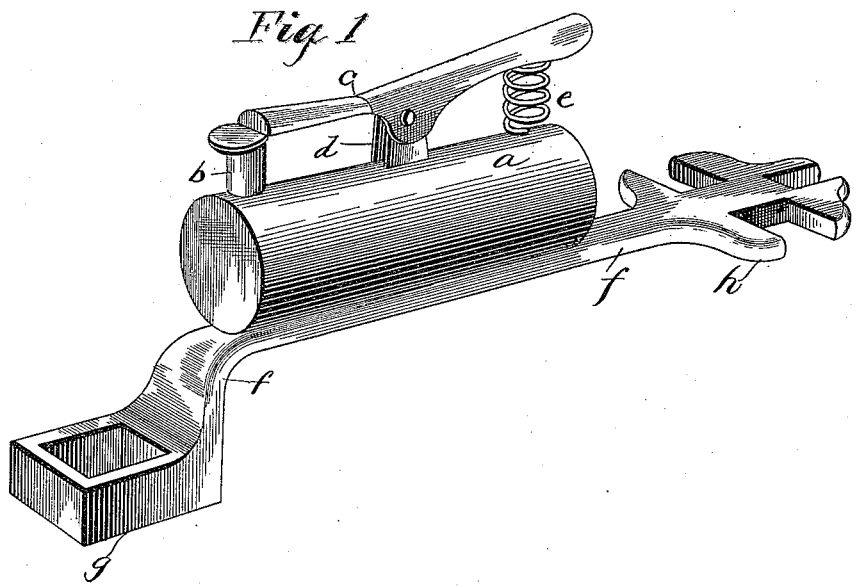
Figure 2:
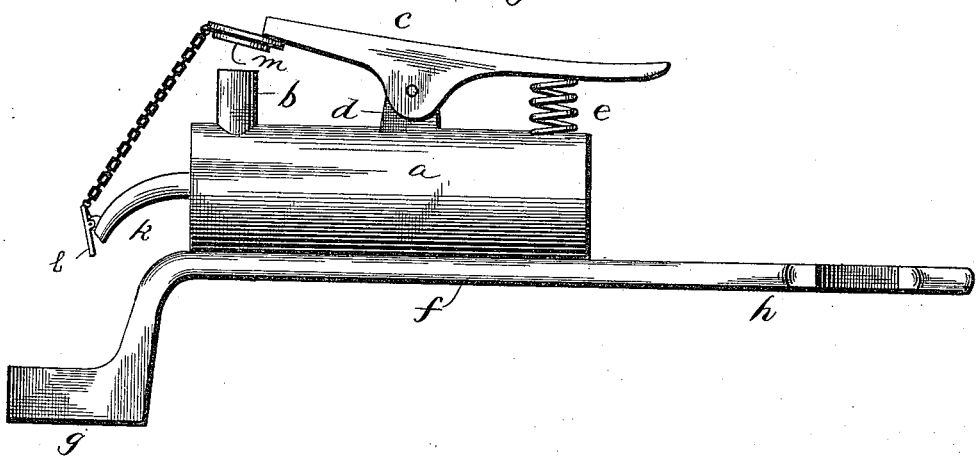

Referring to the accompanying drawings, Figure 1 is a perspective view of this invention. Fig. 2 is a side elevation showing a modification.

In the drawings, the reference-letter $a$ indicates a preferably cylindrical elongated closed reservoir arranged horizontally and constructed of suitable material. A vertical open tube $b$ extends up from the upper side of one end of this reservoir, and the upper open end of this tube is normally closed by means of the spring-rocking lever or stopper $c$. This lever is horizontally and longitudinally located on the upper side of the reservoir, and preferably extends the length of the same. At or about its center said lever is pivoted to an arm $d$, extending up from the upper side of the reservoir, and at one end said lever is provided with a stopper to tightly and normally close the open end of said tube, consisting of a disk provided on its under end with soft material or packing $m$ to rest on the open end of said tube and prevent leakage. The opposite end of the lever forms a handle, and the stopper is tightly held, closing said tube end by means of the expansive coiled spring $e$ interposed between the upper side of the reservoir and the under side of the handle end of the lever. Thus in order to open the tube from the reservoir the handle end of the lever should be depressed. The support for and means by which this reservoir can be readily handled consists of the elongated base or casting $f$, having its ends opposite the front end of the reservoir extending down and formed with a socket $g$ to fit and turn an axle-nut, thereby forming an axle-nut wrench. The opposite end $h$ of this body can be also provided with several rigid jaws forming sockets to receive variously-sized nuts. The reservoir is longitudinally, rigidly, and permanently secured or formed on the upper side of said body about midway between the ends thereof, so that both ends of the body project beyond the opposite ends of the reservoir, and thereby form handles whereby the reservoir or either end of the wrench can be manipulated. The end $h$ of the body forms the usual handle for the reservoir when in use and is grasped by the hand, while the thumb can be used to depress the handle end of the stopper-lever. This reservoir is adapted to contain lubricating-oil for vehicle-axles, and the reservoir can be filled through the discharge-tube $b$.

With this invention the axle-nut can be removed and the axle lubricated without moving the hand from the handle $h$ of the device.

In Fig. 2 the reservoir, in addition to the tube, is shown provided with a discharge-spout $k$, curving forwardly and downwardly from its front end to deliver the oil through socket $g$ without turning the supporting-body, and this spout is provided with a suitable cut-off gate or valve $l$, connected with the stopper-lever for tube $b$, so that this spout can be opened by the stopper-lever and oil can be discharged without tipping the reservoir.

What I claim is—

1. In combination, the body having a socket at one end to hold a nut, the closed reservoir longitudinally and rigidly secured on said body so that the ends of the body project beyond the reservoir, a normally-closed tube arranged to deliver oil through said socket, a rocking lever mounted on the reservoir, having a handle end and its opposite end provided with means to open said tube, and a spring to hold said lever in its normal position, substantially as described.

2. A lubricator consisting in the combination, with the elongated body formed with a rigid socket integral with one end and its opposite end forming a handle, of an oil-reservoir longitudinally and rigidly secured on said body between its ends and having a discharge-spout, arranged as described, so as to deliver through the socket, substantially as described.

3. A lubricator consisting of the elongated integral metal body having the nut-socket in one end, the closed cylindrical reservoir longitudinally located on said body so that the ends thereof extend beyond the reservoir, the short straight open tube extending radially up from the end of said reservoir adjoining the nut-socket, the lug on the upper side of the reservoir between the ends thereof, the lever fulcrumed between its ends on said lug with its handle end projecting beyond the reservoir over the handle end of said body and having a stopper on its other end fitting the upper open end of said tube, and the expansive spring between the reservoir and handle end of the lever, as set forth.

In testimony that I claim the foregoing as my own I affix my signature in presence of two witnesses.

CHARLES SMITH.

Witnesses:
AARON ATEN,
R. L. GRIMES.